US012592105B2

(12) United States Patent
Iwasaki et al.

(10) Patent No.: US 12,592,105 B2
(45) Date of Patent: Mar. 31, 2026

(54) ELECTRONIC CONTROL DEVICE AND METHOD FOR DIAGNOSING ELECTRONIC CONTROL DEVICE

(71) Applicant: Hitachi Astemo, Ltd., Hitachinaka (JP)

(72) Inventors: Mitsuhiro Iwasaki, Hitachinaka (JP); Masahiro Doi, Hitachinaka (JP); Takeo Yamashita, Hitachinaka (JP); Shinichirou Hida, Hitachinaka (JP); Yoshiaki Mizuhashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 208 days.

(21) Appl. No.: 18/563,623

(22) PCT Filed: Mar. 4, 2022

(86) PCT No.: PCT/JP2022/009536

§ 371 (c)(1),
(2) Date: Nov. 22, 2023

(87) PCT Pub. No.: WO2023/053489

PCT Pub. Date: Apr. 6, 2023

(65) Prior Publication Data

US 2024/0371212 A1 Nov. 7, 2024

(30) Foreign Application Priority Data

Sep. 28, 2021 (JP) ................................ 2021-157857

(51) Int. Cl.
*G05B 23/02* (2006.01)
*G07C 5/00* (2006.01)
*G07C 5/08* (2006.01)

(52) U.S. Cl.
CPC .......... *G07C 5/0808* (2013.01); *G07C 5/008* (2013.01); *G07C 5/0816* (2013.01)

(58) Field of Classification Search
CPC ...... H02P 5/00; H02P 6/16; H02P 6/28; H02P 29/024
See application file for complete search history.

(56) References Cited

U.S. PATENT DOCUMENTS

2005/0278090 A1 12/2005 Kushihara
2010/0052449 A1 3/2010 Hashimoto et al.
(Continued)

FOREIGN PATENT DOCUMENTS

JP 2004-257765 A 9/2004
JP 2005-337893 A 12/2005
(Continued)

OTHER PUBLICATIONS

International Search Report (PCT/ISA/210) issued in PCT Application No. PCT/JP2022/009536 dated May 17, 2022 with English translation (6 pages).
(Continued)

*Primary Examiner* — Karen Masih
(74) *Attorney, Agent, or Firm* — Crowell & Moring LLP

(57) ABSTRACT

To provide a highly reliable electronic control device in which an excitation amplifier that outputs an excitation signal to a resolver, a microcomputer, and a power supply IC are mounted, the electronic control device being capable of performing abnormality diagnosis of the excitation amplifier before activation and during operation of a system. An electronic control device includes a power supply IC; a microcomputer to which a power supply voltage is supplied from the power supply IC; an excitation amplifier that excites the resolver; and a diagnostic circuit that monitors an input signal and an output signal of the excitation amplifier and diagnoses abnormality; where the diagnostic circuit compares the input signal with the output signal to perform
(Continued)

abnormality diagnosis of the excitation amplifier, and transmits a diagnosis result to the microcomputer.

11 Claims, 11 Drawing Sheets

(56) References Cited

U.S. PATENT DOCUMENTS

| | | | |
|---|---|---|---|
| 2014/0379204 | A1 | 12/2014 | Goto et al. |
| 2016/0161304 | A1 | 6/2016 | Son et al. |

FOREIGN PATENT DOCUMENTS

| | | | | | |
|---|---|---|---|---|---|
| JP | 2005-345189 | A | | 12/2005 | |
| JP | 2007-315856 | A | | 12/2007 | |
| JP | 2010-63242 | A | | 3/2010 | |
| JP | 2013-140065 | A | | 7/2013 | |
| JP | 2013221917 | A | * | 10/2013 | |
| JP | 2014-17932 | A | | 1/2014 | |
| JP | 2014-117064 | A | | 6/2014 | |
| JP | 2015-59788 | A | | 3/2015 | |
| JP | 2017060304 | A | * | 3/2017 | |
| JP | 2020-46376 | A | | 3/2020 | |
| WO | WO-2014064856 | A1 | * | 5/2014 | ............. G01L 3/105 |
| WO | WO-2021124624 | A1 | * | 6/2021 | ......... G01D 5/24476 |

OTHER PUBLICATIONS

Japanese-language Written Opinion (PCT/ISA/237) issued in PCT Application No. PCT/JP2022/009536 dated May 17, 2022 with English translation (10 pages).

* cited by examiner

ELECTRONIC CONTROL DEVICE AND METHOD FOR DIAGNOSING ELECTRONIC CONTROL DEVICE

TECHNICAL FIELD

The present invention relates to a configuration of an electronic control device and a control thereof, and particularly relates to an effective technique applied to an electronic control device including an excitation amplifier that outputs an excitation signal to a resolver (rotation angle sensor).

BACKGROUND ART

In recent years, a vehicle having a driving support function for supporting steering operation and acceleration/deceleration, a hybrid vehicle that operates using a motor in addition to a conventional engine, or an electric vehicle that operates only with a motor have started to spread. These vehicles have more complicated electronic control than conventional vehicles, and when a failure of an electronic component occurs, more advanced safety control such as safely stopping the vehicle or restricting the operation of the vehicle is required.

In these electronic control devices for vehicles, control for safely stopping a motor, an engine, or the like via a safety control signal when failure occurrence is detected, safety control for continuing operation of the vehicle after limiting a speed of the vehicle and a torque of the motor, and the like are performed, and it is important to accurately detect and diagnose a failure or abnormality of an electronic component used in the electronic control device and utilize it for safety control.

By the way, with the spread of hybrid vehicles and electric vehicles, the importance of a resolver for controlling the rotation of a motor that plays a core role is increasing. The resolver is a rotation angle sensor indispensable for controlling the traveling motor. The power consumption can be suppressed by efficiently controlling the motor. In order to control the motor according to the traveling situation, it is necessary to detect a magnetic pole position of the motor and grasp an accurate rotation speed, and a resolver is used as a sensor therefor.

As a background art of the present technical field, for example, there is a technique such as PTL 1. PTL 1 discloses "a rotation angle detection device including: an excitation signal amplitude detection unit configured to offset an excitation signal of a resolver and detect an amplitude based on the offset excitation signal; an excitation signal voltage detection unit configured to detect a voltage of the excitation signal; and an excitation signal diagnostic unit configured to distinguish an abnormal state in which the amplitude of the excitation signal is outside a normal range between a sky fault and a ground fault of a supply line of the excitation signal based on the voltage of the excitation signal.".

According to PTL 1, an abnormal state of a supply line of an excitation signal in a resolver can be diagnosed by being distinguished between a sky fault and a ground fault.

CITATION LIST

Patent Literature

PTL 1: JP 2020-46376 A

SUMMARY OF INVENTION

Technical Problem

As described above, with the complication and enlargement of the automobile control system, the risk of malfunction of the system increases at the time of failure occurrence. When a defect occurs in a control function of an automobile control system, not only a driver and a passenger but also the entire periphery including a pedestrian is exposed to danger, and thus improvement in reliability of individual parts constituting the system and improvement in reliability of a safety control function for detecting and responding to abnormality of the system are important issues.

In the technique described in PTL 1, obvious abnormality such as a sky fault, a ground fault, and a disconnection of the excitation signal output from the excitation amplifier to the resolver can be detected. However, it is difficult to detect a failure or abnormality of the excitation amplifier that leads to a change in characteristics such as frequency, amplitude, and phase of the excitation signal.

Therefore, an object of the present invention is to provide a highly reliable electronic control device and a method for diagnosing the electronic control device in which an excitation amplifier that outputs an excitation signal to a resolver, a microcomputer, and a power supply IC are mounted, where abnormality diagnosis of the excitation amplifier can be performed before activation and during operation of a system.

Solution to Problem

In order to solve the above problems, the present invention is an electronic control device including a power supply IC; a microcomputer to which a power supply voltage is supplied from the power supply IC; an excitation amplifier that excites the resolver; and a diagnostic circuit that monitors an input signal and an output signal of the excitation amplifier and diagnoses abnormality; where the diagnostic circuit compares the input signal with the output signal to perform abnormality diagnosis of the excitation amplifier, and transmits a diagnosis result to the microcomputer.

Furthermore, the present invention is a method for diagnosing an electronic control device in which an excitation amplifier that outputs an excitation signal to a resolver, a microcomputer, and a power supply IC are mounted, the method including: monitoring an input signal and an output signal of the excitation amplifier; comparing the input signal and the output signal to perform abnormality diagnosis of the excitation amplifier; and transmitting a diagnosis result to the microcomputer.

Advantageous Effects of Invention

According to the present invention, in a highly reliable electronic control device and a method for diagnosing the electronic control device in which an excitation amplifier that outputs an excitation signal to a resolver, a microcomputer, and a power supply IC are mounted, abnormality diagnosis of the excitation amplifier can be performed before activation and during operation of a system.

As a result, an abnormality of the electronic control device can be detected before starting and during operation of the vehicle, and a safety control of the vehicle appropriate for the abnormality can be performed.

Problems, configurations, and effects other than those described above will be clarified by the description of the following embodiments.

DESCRIPTION OF EMBODIMENTS

Figure 1:
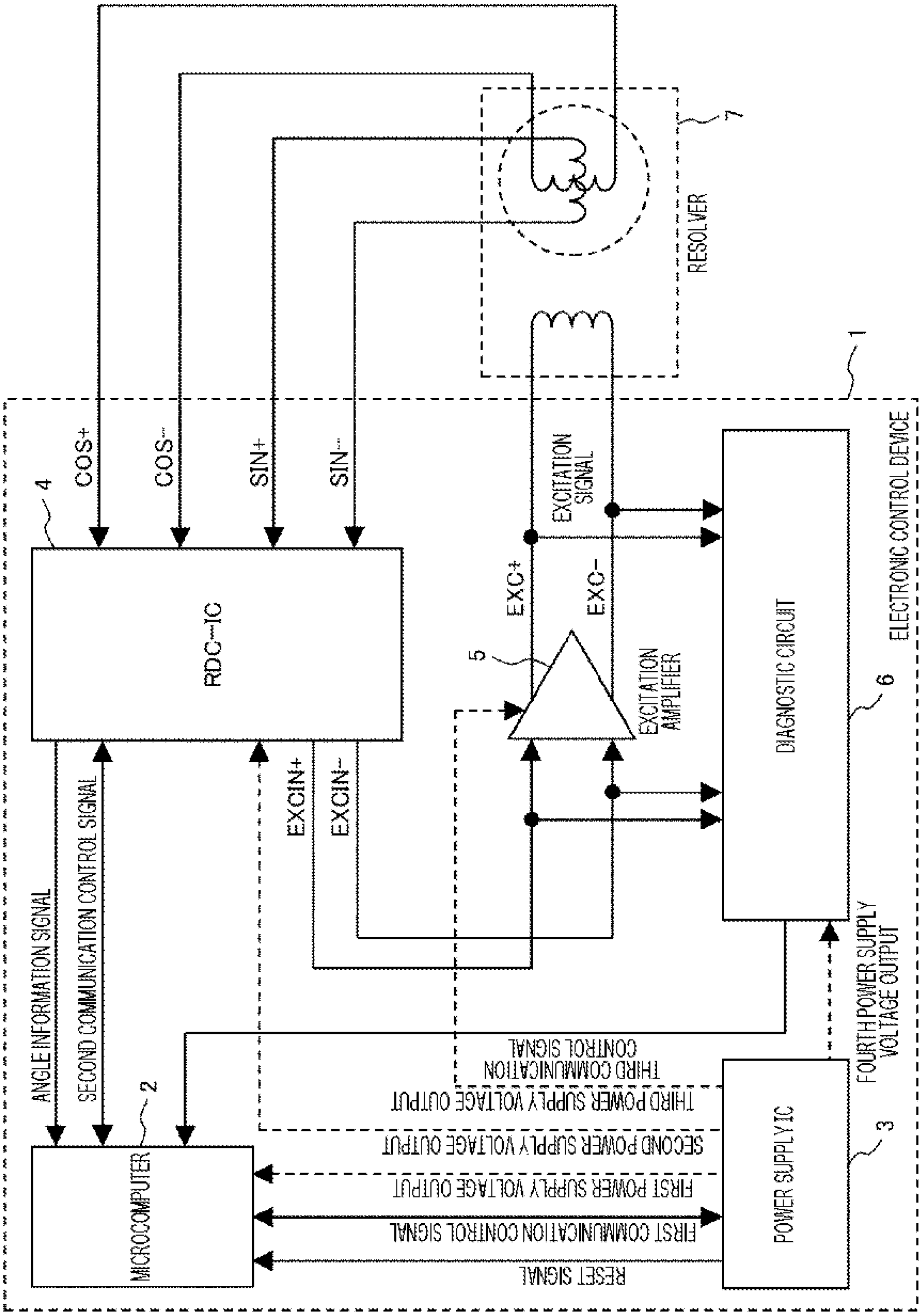
FIG. 1 is a block diagram of an electronic control device according to a first example of the present invention.

Hereinafter, embodiments of the present invention will be described with reference to the drawings. In the drawings, the same components are denoted by the same reference numerals, and the detailed description of redundant components will be omitted.

First Example

<<Configuration of Electronic Control Device>>

With reference to FIGS. 1 to 5, an electronic control device and a method for diagnosing the same according to a first example of the present invention will be described. FIG. 1 is a block diagram illustrating an internal configuration of an electronic control device of the present example.

As illustrated in FIG. 1, the electronic control device 1 of the present example includes a microcontroller (microcomputer) 2, a power supply integrated circuit (IC) 3, a resolver-digital converter IC (RDC-IC) 4, an excitation amplifier 5, and a diagnostic circuit 6.

The microcomputer 2 is the brain of the electronic control device 1, and controls the power supply IC 3 and the RDC-IC 4 using a first communication control signal and a second communication control signal. For example, the setting of the power supply IC 3 can be changed, the state of the microcomputer 2 itself can be transmitted to the power supply IC 3, and the state of the power supply IC 3 can be confirmed by communicating with the power supply IC 3 via the first communication control signal. In addition, the setting of the RDC-IC 4 can be changed or the input signal of the excitation amplifier 5 can be output via the second communication control signal.

The power supply IC 3 generates a plurality of power supply voltages from a battery voltage (not illustrated), and supplies the power supply voltages of the microcomputer 2, the RDC-IC 4, the excitation amplifier 5, the diagnostic circuit 6, and other peripheral circuits (not illustrated) inside the electronic control device. Although the power supply voltage outputs 1 to 4 are illustrated here, the power supply voltage outputs may be supplied to different destinations or in different numbers. In addition, the power supply IC 3 outputs a reset signal to the microcomputer 2 when the system needs to be reset, such as when power is supplied to the electronic control device 1.

The RDC-IC 4 is an IC that performs calculation using an angle signal (COS+, COS−, SIN+, SIN−) that changes according to a rotation angle of a rotor of the motor output from the resolver 7, which is a rotation angle sensor attached to a motor (not illustrated) to detect a rotation angle of the motor, and converts the rotation angle of the motor into digital data. The RDC-IC 4 transmits the rotation angle information of the motor obtained by the calculation to the microcomputer 2 by an angle information signal.

The excitation amplifier 5 is an amplifier that amplifies an input signal (EXCIN+, EXCIN−) of the excitation amplifier 5 output from the RDC-IC 4 and generates an excitation signal (EXC+, EXC−) for exciting the resolver 7. Here, an example in which a differential signal is used is illustrated, but a single-end configuration may be adopted.

The diagnostic circuit 6 compares the input signal (EXCIN+, EXCIN−) and the excitation signal (EXC+, EXC−), which is an output signal of the excitation amplifier 5, and diagnoses abnormality of the excitation amplifier 5. The abnormality diagnosis result of the excitation amplifier 5 obtained by comparing the input/output signals of the excitation amplifier 5 is transmitted to the microcomputer 2 using the third communication control signal. The microcomputer 2 performs an appropriate safety control set in advance on the electronic control device 1 according to the abnormality diagnosis result of the excitation amplifier 5 transmitted from the diagnostic circuit 6.

<<Internal Configuration of Diagnostic Circuit>>

Figure 2:
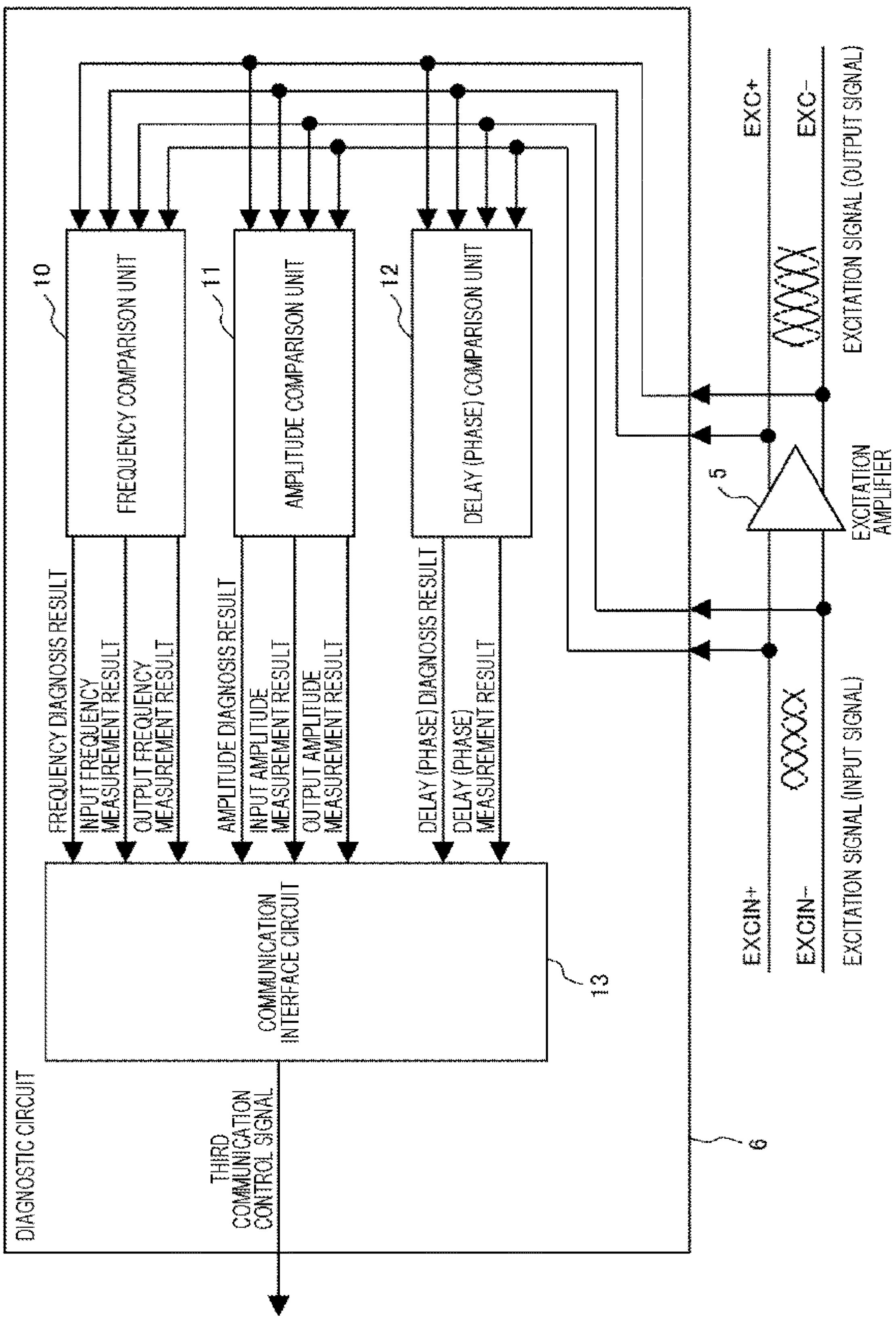
FIG. 2 is a block diagram of a diagnostic circuit of FIG. 1.

FIG. 2 is a block diagram illustrating an internal configuration of the diagnostic circuit 6 of FIG. 1. How the diagnostic circuit 6 diagnoses the abnormality of the excitation amplifier 5 will be described with reference to FIG. 2.

The diagnostic circuit 6 includes a frequency comparison unit 10, an amplitude comparison unit 11, delay (phase) comparison unit 12, and a communication interface circuit 13.

An exciting signal (EXCIN+, EXCIN−) which is an input signal of the excitation amplifier 5 and an excitation signal (EXC+, EXC−) which is signal of the excitation amplifier 5 are input to the frequency comparison unit 10, the amplitude comparison unit 11, and the delay (phase) comparison unit 12, respectively, processing is performed in each comparison unit, and an abnormality diagnosis result of the excitation amplifier 5 is output to the communication interface circuit.

In FIG. 2, the diagnostic circuit 6 is interiorly mounted with the frequency comparison unit 10, the amplitude comparison unit 11, and the delay (phase) comparison unit 12, but the diagnosis of the excitation amplifier 5 can be enabled with at least one of these comparison units, and a plurality of these comparison units may be used in combination.

<<Internal Configuration of Frequency Comparison Unit>>

Figure 3:
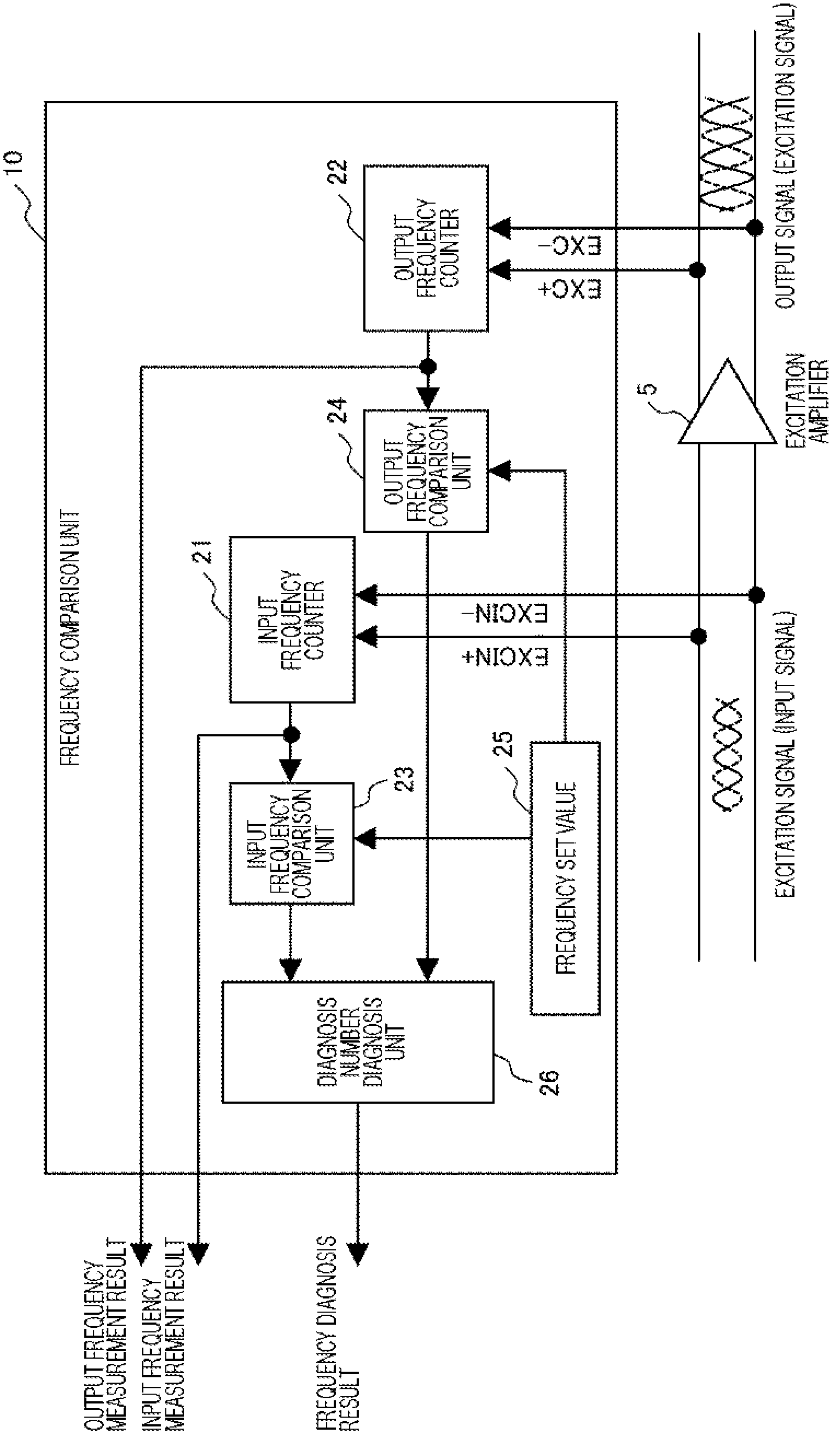
FIG. 3 is a block diagram of a frequency comparison unit of FIG. 2.

FIG. 3 is a block diagram illustrating an example of an internal configuration of the frequency comparison unit 10 of FIG. 2. How the frequency comparison unit 10 diagnoses the abnormality of the excitation amplifier 5 will be described with reference to FIG. 3.

An input signal (EXCIN+, EXCIN−) and an excitation signal (EXC+, EXC−) of the excitation amplifier 5 are input to the frequency comparison unit 10. The frequency of the input signal (EXCIN+, EXCIN−) of the excitation amplifier 5 is measured by an input frequency counter 21, and the frequency of the excitation signal (EXC+, EXC−) is measured by an output frequency counter 22.

The measurement results of the frequency are output to the outside of the frequency comparison unit 10 as an input frequency measurement result and an output frequency measurement result, respectively. In addition, the input frequency measurement result is frequency compared with the frequency set value 25 in the input frequency comparison unit 23, and the output frequency result is frequency compared with the frequency set value in the output frequency comparison unit 24.

The comparison results of the input frequency comparison unit 23 and the output frequency comparison unit 24 are input to the frequency diagnosis unit 26, and the frequency diagnosis unit 26 detects abnormality of the input signal (EXCIN+, EXCIN−) and the excitation signal (EXC+, EXC−) of the excitation amplifier 5 and diagnoses the excitation amplifier 5.

As described above, in a case where the frequency of the exciting signal (EXCIN+, EXCIN−) which is the input signal of the excitation amplifier 5 has abnormality, the frequency comparison unit 10 can determine that the abnormality occurred in the preceding stage of the excitation amplifier 5. Furthermore, when the frequency of the excitation signal (EXC+, EXC−), which is the output signal of the excitation amplifier 5 has abnormality, determination can be made that the excitation amplifier 5 itself has abnormality.

The configuration described here is merely an example, and other configurations may be adopted as long as the functions described above can be implemented in the frequency comparison unit 10.

<<Internal Configuration of Amplitude Comparison Unit>>

Figure 4:
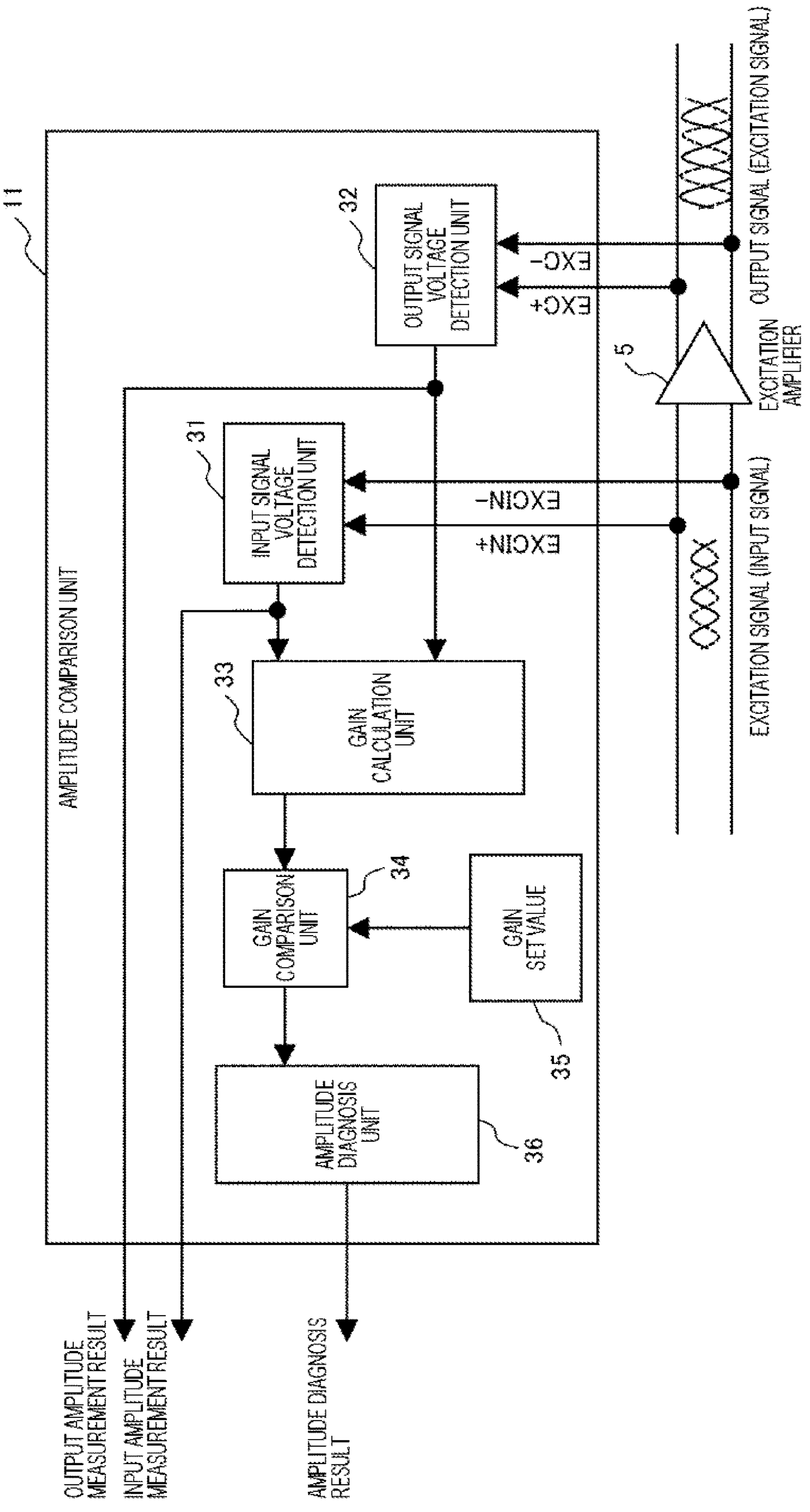
FIG. 4 is a block diagram of an amplitude comparison unit of FIG. 2.

FIG. 4 is a block diagram illustrating an example of an internal configuration of the amplitude comparison unit 11 of FIG. 2. How the amplitude comparison unit 11 diagnoses the abnormality of the excitation amplifier 5 will be described with reference to FIG. 4.

The input signal (EXCIN+, EXCIN−) and the excitation signal (EXC+, EXC−) of the excitation amplifier 5 are input to the amplitude comparison unit 11. The voltage of the input signal (EXCIN+, EXCIN−) of the excitation amplifier 5 is measured by an input signal voltage detection unit 31, and the voltage of the excitation signal (EXC+, EXC−) is measured by an output signal voltage detection unit 32.

The measurement results of the voltage are output to the outside of the amplitude comparison unit 11 as an input amplitude measurement result and an output amplitude measurement result, respectively. For the input amplitude measurement result and the output amplitude measurement result, a gain calculation unit 33 calculates a gain from the input signal (EXCIN+, EXCIN−) to the excitation signal (EXC+, EXC−) of the excitation amplifier 5.

A gain comparison unit 34 compares the value of the calculated gain with a gain set value 35. Amplitude diagnosis unit 36 detects the abnormality of the excitation signal (EXC+, EXC−) using the comparison result, and diagnoses the excitation amplifier 5.

From the above, the amplitude comparison unit 11 can diagnose whether the excitation signal (EXC+, EXC−) is amplified with a desired gain with respect to the input amplitude of the input signal (EXCIN+, EXCIN−) of the excitation amplifier 5.

Furthermore, the input amplitude measurement result is output to the outside of the amplitude comparison unit 11, and the microcomputer 2 can also detect abnormality of the input signal (EXCIN+, EXCIN−) of the excitation amplifier 5 by the third communication control signal from the diagnostic circuit 6.

The configuration described here is merely an example, and other configurations may be adopted as long as the functions described above can be implemented in the amplitude comparison unit 11.

<<Internal Configuration of Delay (Phase) Comparison Unit>>

Figure 5:
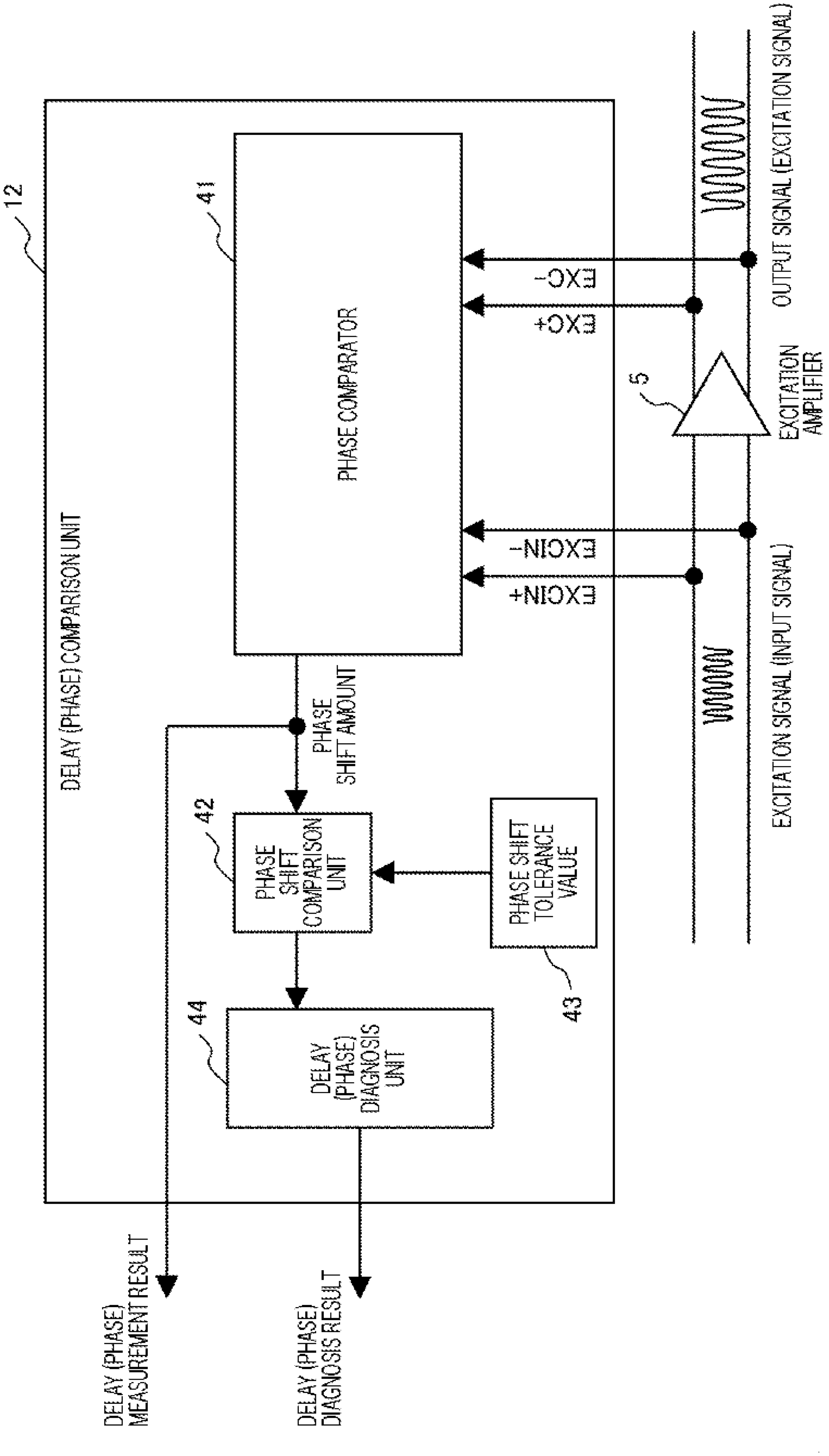
FIG. 5 is a block diagram of a delay (phase) comparison unit of FIG. 2.

FIG. 5 is a block diagram illustrating an example of an internal configuration of the delay (phase) comparison unit 12 of FIG. 2. How the delay (phase) comparison unit 12 diagnoses the abnormality of the excitation amplifier 5 will be described with reference to FIG. 5.

The input signal (EXCIN+, EXCIN−) and the excitation signal (EXC+, EXC−) of the excitation amplifier 5 are input to the delay (phase) comparison unit 12. The input signal (EXCIN+, EXCIN−) and the excitation signal (EXC+, EXC−) of the excitation amplifier 5 are input to the phase comparator 41, and the delay amount (phase shift amount) of the input signal (EXCIN+, EXCIN−) and the excitation signal (EXC+, EXC−) of the excitation amplifier 5 is detected.

The delay amount (phase shift amount) detected by the phase comparator 41 is output to the outside of the delay (phase) comparison unit 12 as a delay (phase) measurement result. The delay (phase) measurement result is compared with a phase shift allowable value 43 in the phase shift comparison unit 42.

Using the comparison result, the delay (phase) diagnosis unit 44 detects an abnormality between the input signal (EXCIN+, EXCIN−) and the excitation signal (EXC+, EXC−) of the excitation amplifier 5 and diagnoses the excitation amplifier 5.

From the above, when an abnormal delay (phase shift) is detected between the input signal (EXCIN+, EXCIN−) and the excitation signal (EXC+, EXC−) of the excitation amplifier 5, the delay (phase) comparison unit 12 can determine that the excitation amplifier 5 itself has abnormality.

The configuration described here is merely an example, and other configurations may be adopted as long as the functions described above can be implemented in the delay (phase) comparison unit 12.

Second Example

<<Example in which Function of RDC-IC is Mounted on Microcomputer>>

Figure 6:
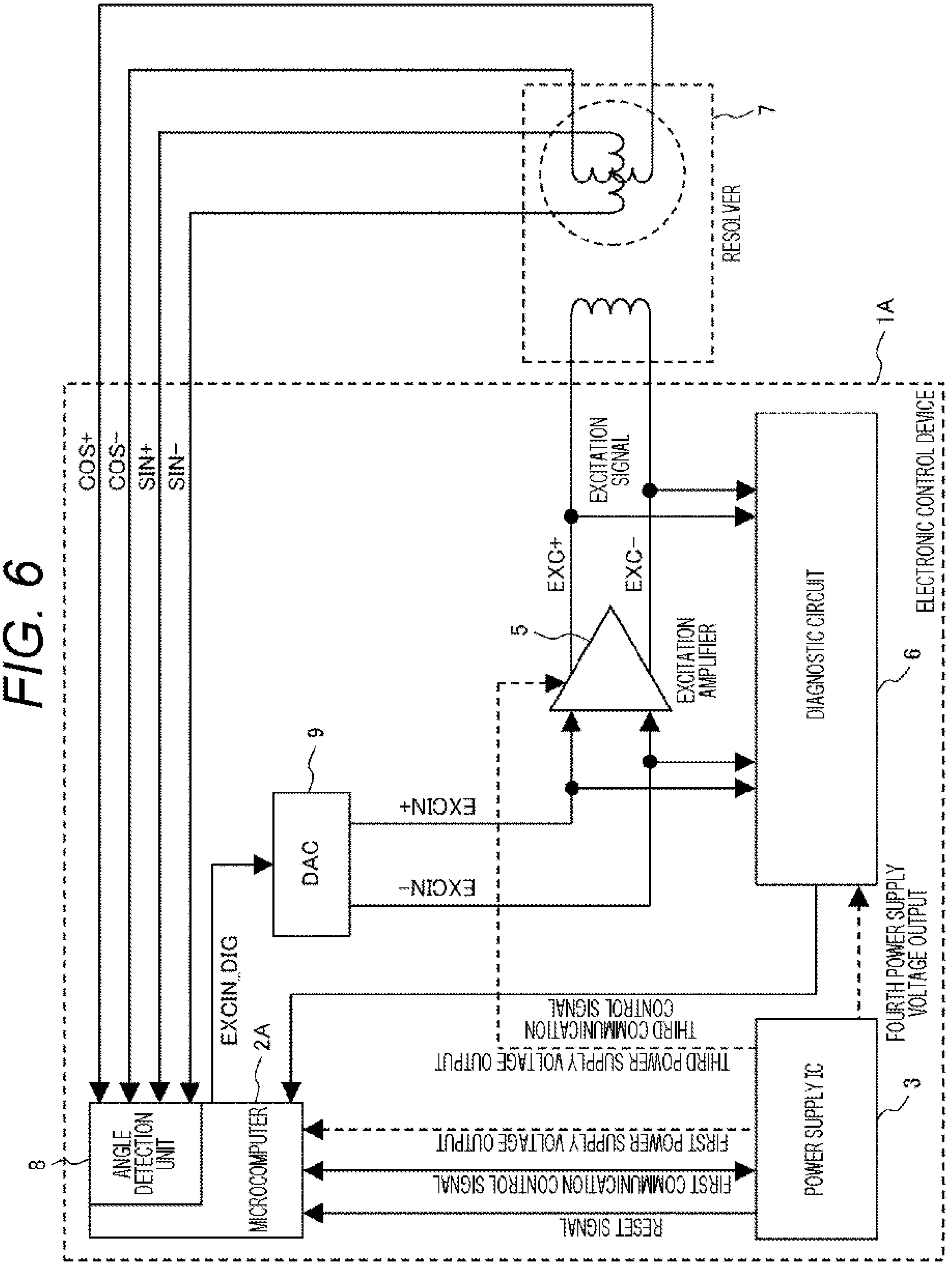
FIG. 6 is a block diagram of an electronic control device according to a second example of the present invention.

An electronic control device according to a second example of the present invention will be described with reference to FIG. 6. FIG. 6 is a block diagram illustrating an internal configuration of an electronic control device of the present example.

As illustrated in FIG. 6, an electronic control device 1A of the present example includes a microcomputer 2A incorporating an angle detection unit 8, a power supply IC 3, an excitation amplifier 5, and a diagnostic circuit 6.

A difference from the first example is that a function of an RDC-IC is incorporated in the microcomputer. The microcomputer 2A outputs a digital signal (EXCIN_DIG), a digital-analog converter (DAC) 9 converts the digital signal (EXCIN_DIG) into an analog signal and outputs an input signal (EXCIN+, EXCIN−) of the excitation amplifier 5, and the excitation amplifier 5 outputs the excitation signal (EXC+, EXC−) to the resolver 7.

The resolver 7 outputs an angle signal (COS+, COS−, SIN+, SIN−) that changes according to the rotation angle of the rotor of the motor (not illustrated), and the microcomputer 2A receives the angle signal (COS+, COS−, SIN+, SIN−) in the incorporating angle detection unit 8 and detects the rotation angle of the motor by calculation.

Other operations, control, and the like of the electronic control device 1A are similar to those of the first example.

Here, the microcomputer 2A outputs the digital signal (EXCIN_DIG), but if the microcomputer 2A can directly output the analog signal, the microcomputer 2A may directly output the input signal (EXCIN+, EXCIN−) of the excitation amplifier 5 to the excitation amplifier 5 without using the DAC 9.

Third Example

<<Example in which Function of RDC-IC is Mounted on Microcomputer, and Excitation Amplifier and Diagnostic Circuit are Mounted on Power Supply IC>>

Figure 7:
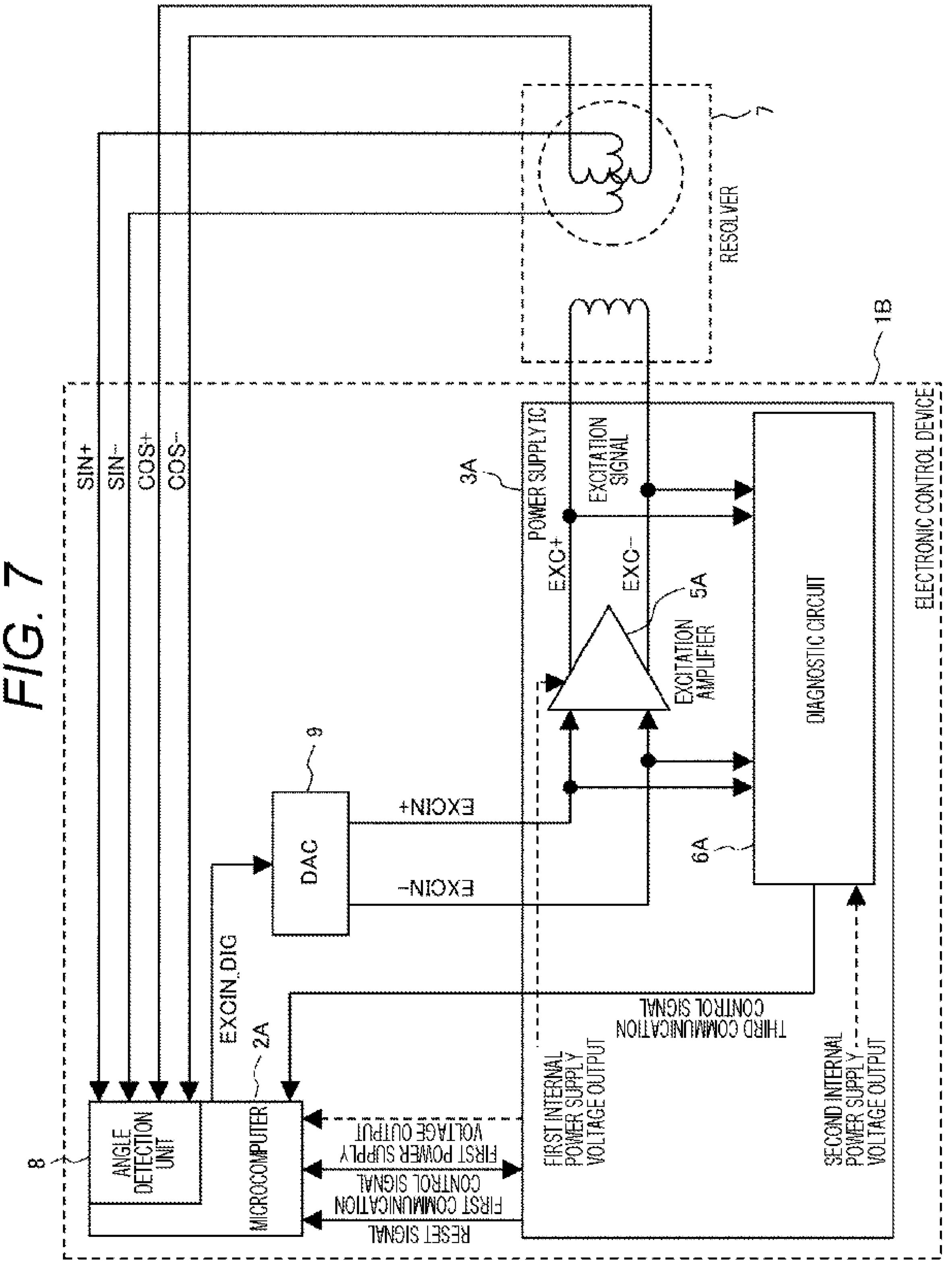
FIG. 7 is a block diagram of an electronic control device according to a third example of the present invention.

An electronic control device and a method for diagnosing the same according to a third example of the present invention will be described with reference to FIGS. 7 to 9. FIG. 7 is a block diagram illustrating an internal configuration of an electronic control device of the present example.

As illustrated in FIG. 7, an electronic control device 1B of the present example includes a microcomputer 2A incorporating an angle detection unit 8, and a power supply IC 3A incorporating an excitation amplifier 5A and a diagnostic circuit 6A.

The third embodiment is different from the first example in that a function of the RDC-IC is incorporated in the microcomputer, and in that the excitation amplifier and the diagnostic circuit are incorporated in the power supply IC. The microcomputer 2A outputs a digital signal (EXCIN_DIG), the DAC 9 converts the digital signal (EXCIN_DIG) into an analog signal and outputs an input signal (EXCIN+, EXCIN−) of the excitation amplifier 5A incorporated in the power supply IC 3A, and the excitation amplifier 5A outputs the excitation signal (EXC+, EXC−) to the resolver 7.

The resolver 7 outputs an angle signal (COS+, COS−, SIN+, SIN−) that changes according to the rotation angle of the rotor of the motor (not illustrated), and the microcomputer 2A receives the angle signal (COS+, COS−, SIN+, SIN−) in the incorporating angle detection unit 8 and detects the rotation angle of the motor by calculation.

The diagnostic circuit 6A incorporated in the power supply IC 3A is used to compare the input signal (EXCIN+, EXCIN−) of the excitation amplifier 5A with the excitation signal (EXC+, EXC−) which is an output signal to diagnose the abnormality of the excitation amplifier 5A.

The abnormality diagnosis result of the excitation amplifier 5A obtained by comparing the input/output signals of the excitation amplifier 5 is transmitted to the microcomputer 2A using the third communication control signal. According to the abnormality diagnosis result of the excitation amplifier 5A transmitted from the diagnostic circuit 6A, the microcomputer 2A can perform safety control such as motor stop and motor torque limitation on the electronic control device 1A in accordance with the preset program content.

Here, the microcomputer 2A outputs the digital signal (EXCIN_DIG), but if the microcomputer 2A can directly output the analog signal, the microcomputer 2A may directly output the input signal (EXCIN+, EXCIN−) of the excitation amplifier 5A to the excitation amplifier 5A without using the DAC 9. Although the DAC 9 is disposed outside the power supply IC 3A, the DAC 9 may be incorporated in the power supply IC 3A.

<<Excitation Amplifier Diagnosis before System Activation>>

Figure 8:
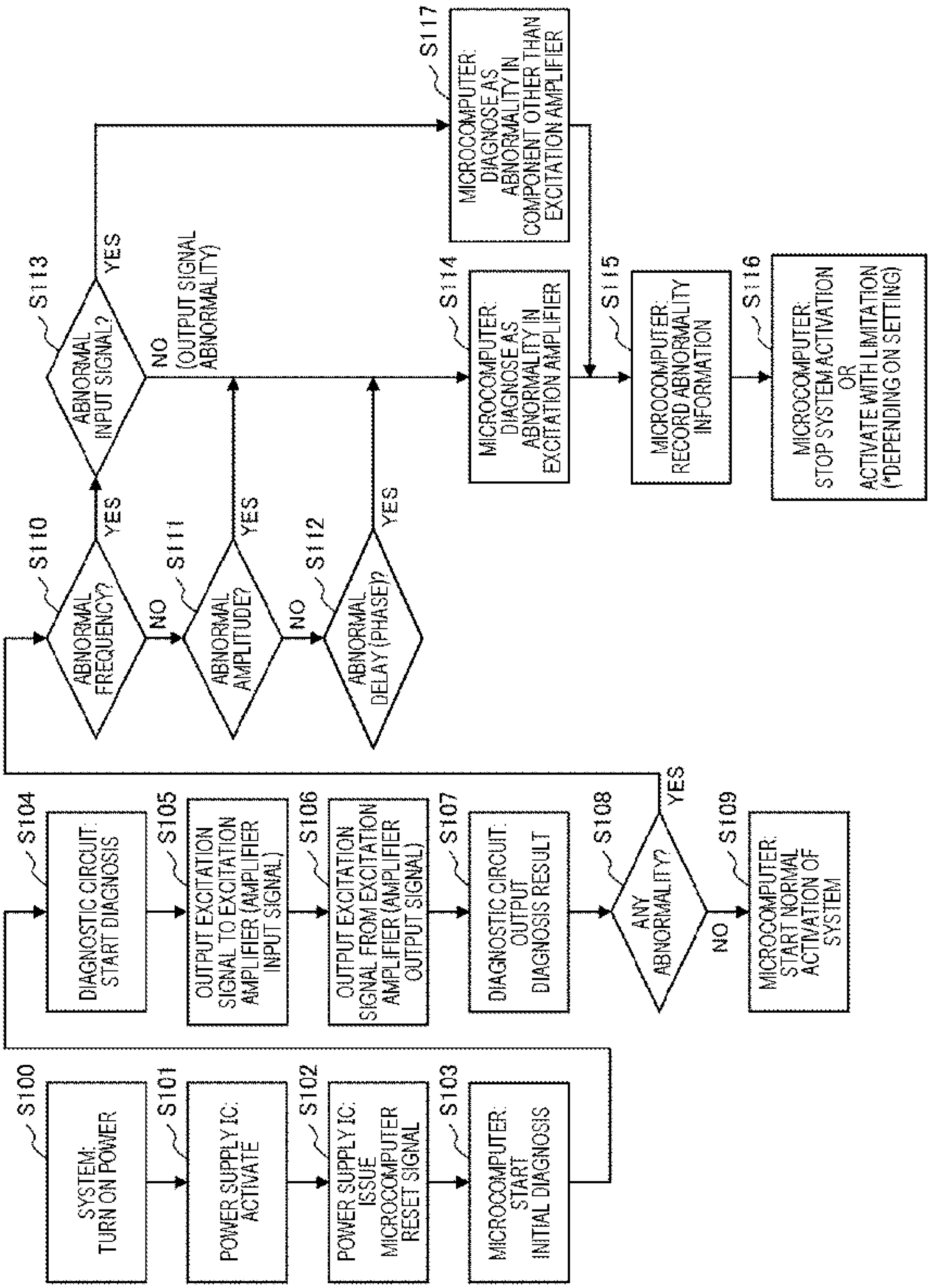
FIG. 8 is a flowchart illustrating a method for diagnosing the electronic control device of FIG. 7 before system activation.

FIG. 8 is a flowchart in a case where abnormality diagnosis of the excitation amplifier 5A is performed before the system activation in the electronic control device 1B of FIG. 7.

When power is supplied to the electronic control device 1B (step S100), the power supply IC 3A starts activation (step S101). When activated, the power supply IC 3A generates a power supply voltage output to be supplied to each unit of the electronic control device 1B and issues a reset signal to the microcomputer 2A (step S102).

Then, the microcomputer 2A is initialized, and an initial diagnosis of each unit of the electronic control device 1B is started (step S103). When the initial diagnosis is started, the diagnostic circuit 6A starts the diagnosis operation of the excitation amplifier 5A (step S104), and the microcomputer 2A outputs an input signal (EXCIN+, EXCIN−) of the excitation amplifier 5A (step S105).

Then, excitation amplifier 5A outputs the excitation signal (EXC+, EXC−), which is the output signal corresponding to the input signal, to the resolver 7 (step S106). During this time, diagnostic circuit 6A performs abnormality diagnosis of the excitation amplifier using the input signal and the output signal of the excitation amplifier 5A, and outputs the diagnosis result (step S107).

Here, when there is no particular abnormality (determined as NO in step S108), the microcomputer 2A starts the normal activation of the system of the electronic control device 1B (step S109).

On the other hand, when an abnormality is found (determined as YES in step S108), determination is made on whether the abnormality is a frequency abnormality (step S110), an amplitude abnormality (step S111), or a delay (phase) abnormality (step S112).

If the frequency abnormality is confirmed and the abnormality is an input frequency abnormality (determined as YES in step S113), the microcomputer 2A determines that the cause of the abnormality is other than the excitation amplifier 5A (step S117).

On the other hand, when the abnormality of the output frequency is confirmed, when the amplitude abnormality is confirmed, and when the delay (phase) abnormality is confirmed, the microcomputer 2A determines that the excitation amplifier 5A has abnormality (step S114).

When the microcomputer 2A determines that there is an abnormality in the excitation amplifier 5A or that there is an abnormality other than in the excitation amplifier 5A, the microcomputer 2A records the diagnosis result in a memory, a register, or the like (step S115).

Thereafter, the microcomputer 2A uses the diagnosis result to perform safety control such as stopping the system activation or limiting the system activation and then activating the system (step S116).

In this safety control, different controls such as motor stop and motor torque limitation can be performed according to a program set in the microcomputer 2A or the like in advance.

As described above, the abnormality diagnosis of the excitation amplifier 5A is performed before the activation of the electronic control device 1B, and the safety control can be performed when the abnormality is confirmed.

<<Excitation Amplifier Diagnosis During System Operation>>

Figure 9:
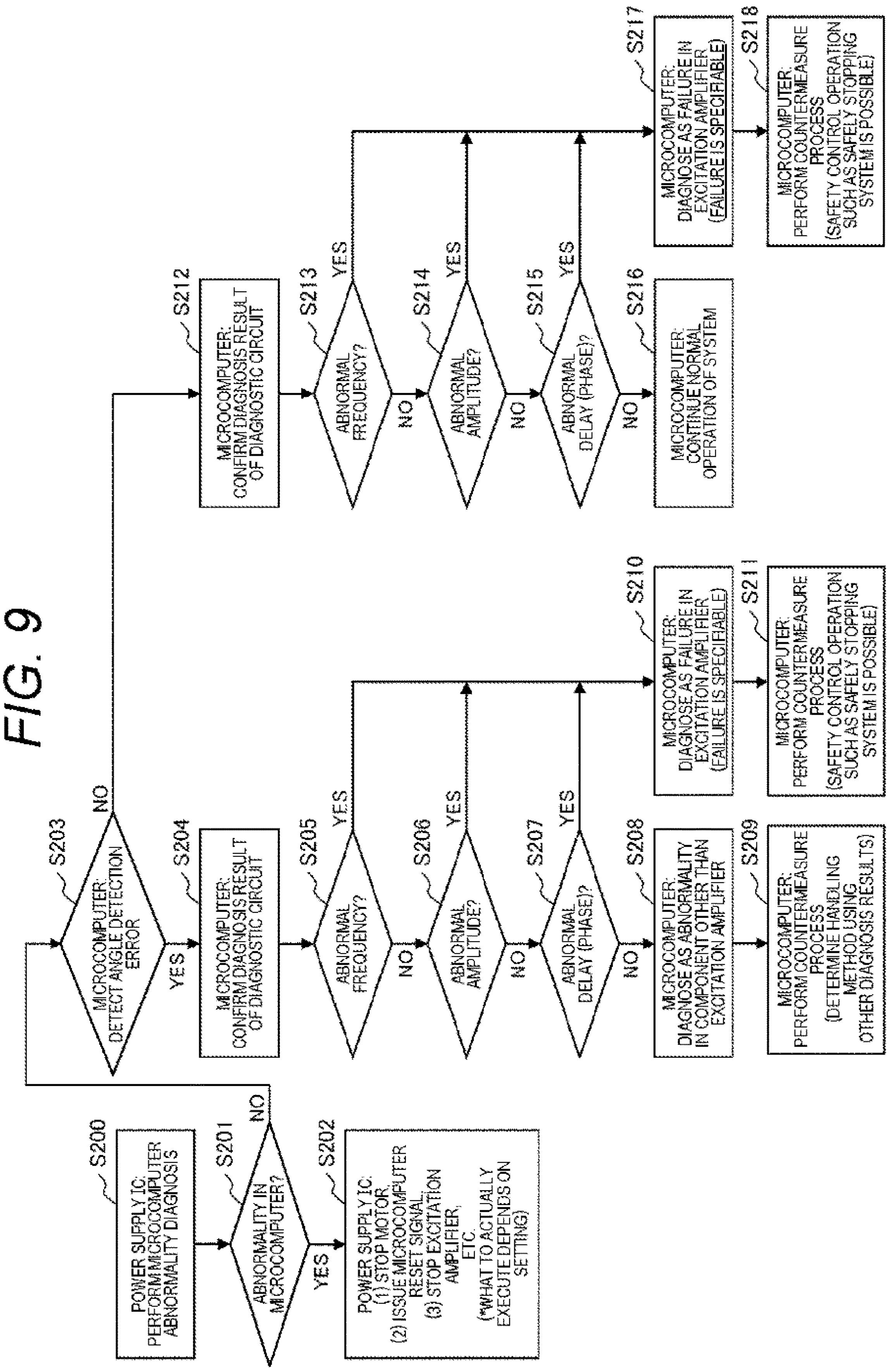
FIG. 9 is a flowchart illustrating a method for diagnosing the electronic control device of FIG. 7 before system operation.

FIG. 9 is a flowchart in a case where abnormality diagnosis of the excitation amplifier 5A is performed during the system operation in the electronic control device 1B of FIG. 7.

During the system operation, the power supply IC 3A constantly performs abnormality diagnosis of the microcomputer 2A (step S200), confirms whether or not the microcomputer 2A has an abnormality (step S201), and when the microcomputer 2A has an abnormality (determined as YES in step S201), the power supply IC 3A performs safety control such as stopping the motor, issuing a microcomputer reset signal, and stopping the excitation amplifier 5A (step S202).

In this safety control, control contents such as stopping of the motor and torque limitation of the motor can be changed by the setting performed on the power supply IC 3A in advance.

Here, abnormality diagnosis of the microcomputer 2A by the power supply IC 3A is performed based on the Watch Dog Timer, a monitored value of a clock periodically received from the microcomputer, direct error signal reception from the microcomputer 2A, and the like.

In a case where the microcomputer 2A does not have abnormality (determined as NO in step S201), when the microcomputer 2A detects an angle detection error in the angle detection unit 8 (determined as YES in step S203), the microcomputer 2A confirms the diagnosis result of the diagnostic circuit 6A (step S204).

When there is no abnormality in the confirmation of the frequency abnormality (step S205), the confirmation of the amplitude abnormality (step S206), and the confirmation of the delay (phase) abnormality (step S207), the microcomputer 2A determines that there is an abnormality at other than the excitation amplifier 5A (step S208), and the microcomputer 2A executes the countermeasure processing using information other than the diagnosis result of the diagnostic circuit 6A (step S209).

When there is abnormality in any of the confirmation of the frequency abnormality (step S205), the confirmation of the amplitude abnormality (step S206), and the confirmation of the delay (phase) abnormality (step S207), the microcomputer 2A determines that the excitation amplifier 5A has failed (step S210), and executes safety control such as safely stopping the system (step S211). The content of the safety control can be changed by the setting performed in advance on the microcomputer 2A or the like.

Furthermore, when the microcomputer 2A does not detect the angle detection error in the angle detection unit 8 in step S203, the microcomputer 2A similarly confirms the diagnosis result of the diagnostic circuit 6A (step 212).

When there is no abnormality in the confirmation of the frequency abnormality (step S213), the confirmation of the amplitude abnormality (step S214), and the confirmation of the delay (phase) abnormality (step S215), the microcomputer 2A continues the normal operation of the system (step S216).

On the other hand, when there is abnormality in any of the confirmation of the frequency abnormality (step S213), the confirmation of the amplitude abnormality (step S214), and the confirmation of the delay (phase) abnormality (step S215), the microcomputer 2A determines that the excitation amplifier 5A has failed (step S217), and executes safety control such as safely stopping the system (step S218). The content of the safety control can be changed by the setting performed in advance on the microcomputer 2A or the like.

Fourth Example

<<Example in which Excitation Amplifier and Diagnostic Circuit are Mounted on Power Supply IC>>

Figure 10:
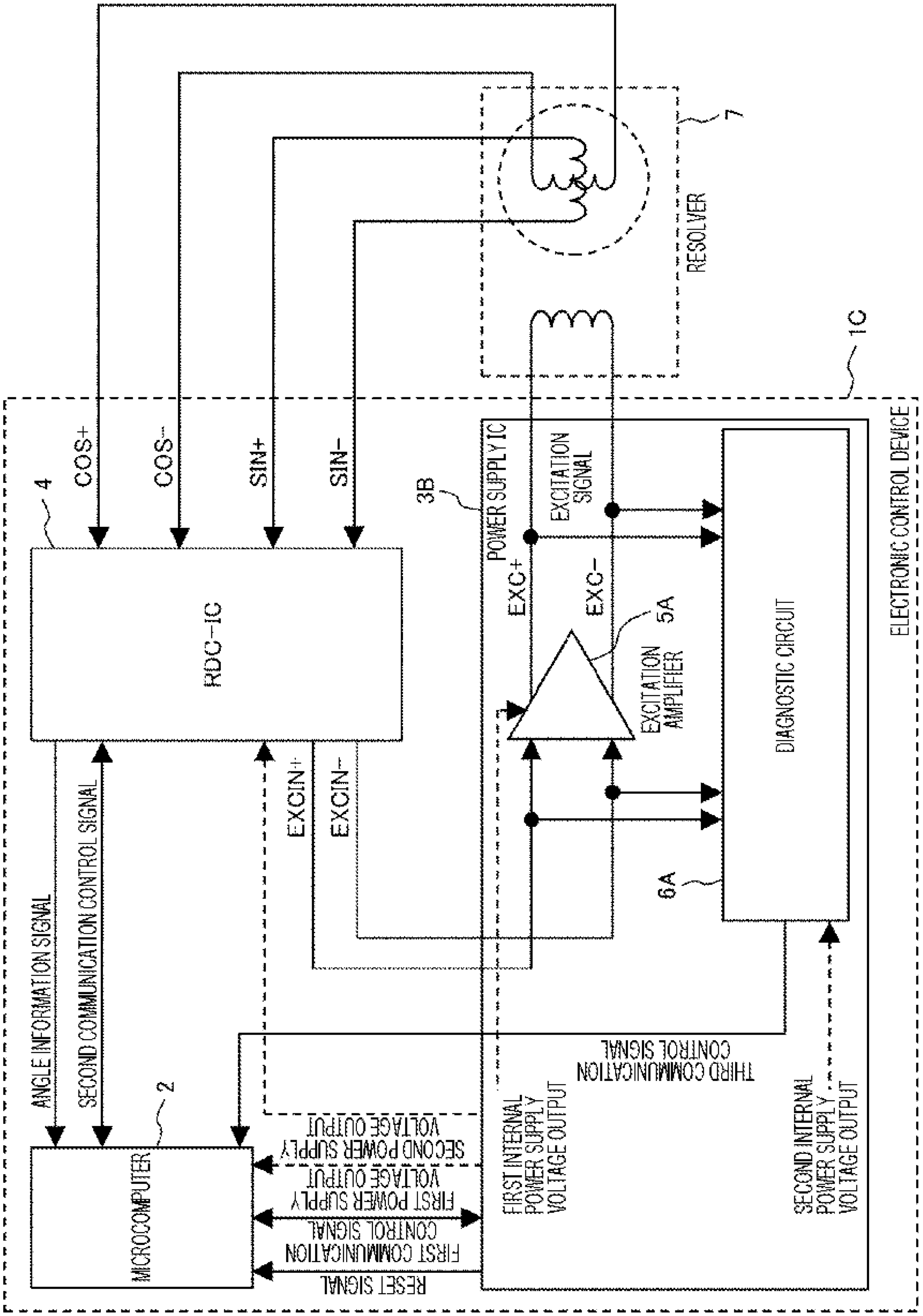
FIG. 10 is a block diagram of an electronic control device according to a fourth example of the present invention.

An electronic control device and a method for diagnosing the same according to a fourth example of the present invention will be described with reference to FIG. 10. FIG. 10 is a block diagram illustrating an internal configuration of an electronic control device of the present example.

As illustrated in FIG. 10, an electronic control device 1C of the present example includes a microcomputer 2, an RDC-IC 4, and a power supply IC 3B incorporating an excitation amplifier 5A and a diagnostic circuit 6A.

The difference from the first example is that the excitation amplifier 5A and the diagnostic circuit 6A are incorporated in the power supply IC 3B. The RDC-IC 4 outputs an input signal (EXCIN+, EXCIN−) of the excitation amplifier 5A incorporated in the power supply IC 3B, and the excitation amplifier 5 outputs the excitation signal (EXC+, EXC−) to the resolver 7.

The resolver 7 outputs an angle signal (COS+, COS−, SIN+, SIN−) that changes according to the rotation angle of the rotor of the motor (not illustrated), and the RDCIC 4 performs calculation using the angle signal (COS+, COS−, SIN+, SIN−), detects the rotation angle of the motor, and transmits the information to the microcomputer 2 by the angle information signal.

The diagnostic circuit 6A incorporated in the power supply IC 3B is used to compare the input signal (EXCIN+, EXCIN−) with the excitation signal (EXC+, EXC−) which is an output signal of the excitation amplifier 5A to diagnose the abnormality of the excitation amplifier 5A.

The abnormality diagnosis result of the excitation amplifier 5A obtained by comparing the input/output signals of the excitation amplifier 5A is transmitted to the microcomputer 2 using the third communication control signal. The microcomputer 2 performs an appropriate safety control set in advance on the electronic control device 1C according to the abnormality diagnosis result of the excitation amplifier 5A transmitted from the diagnostic circuit 6A.

Fifth Example

<<Example in which Input Signal of Excitation Amplifier is Output from Microcomputer, and Excitation Amplifier and Diagnostic Circuit are Mounted on Power Supply IC>>

Figure 11:
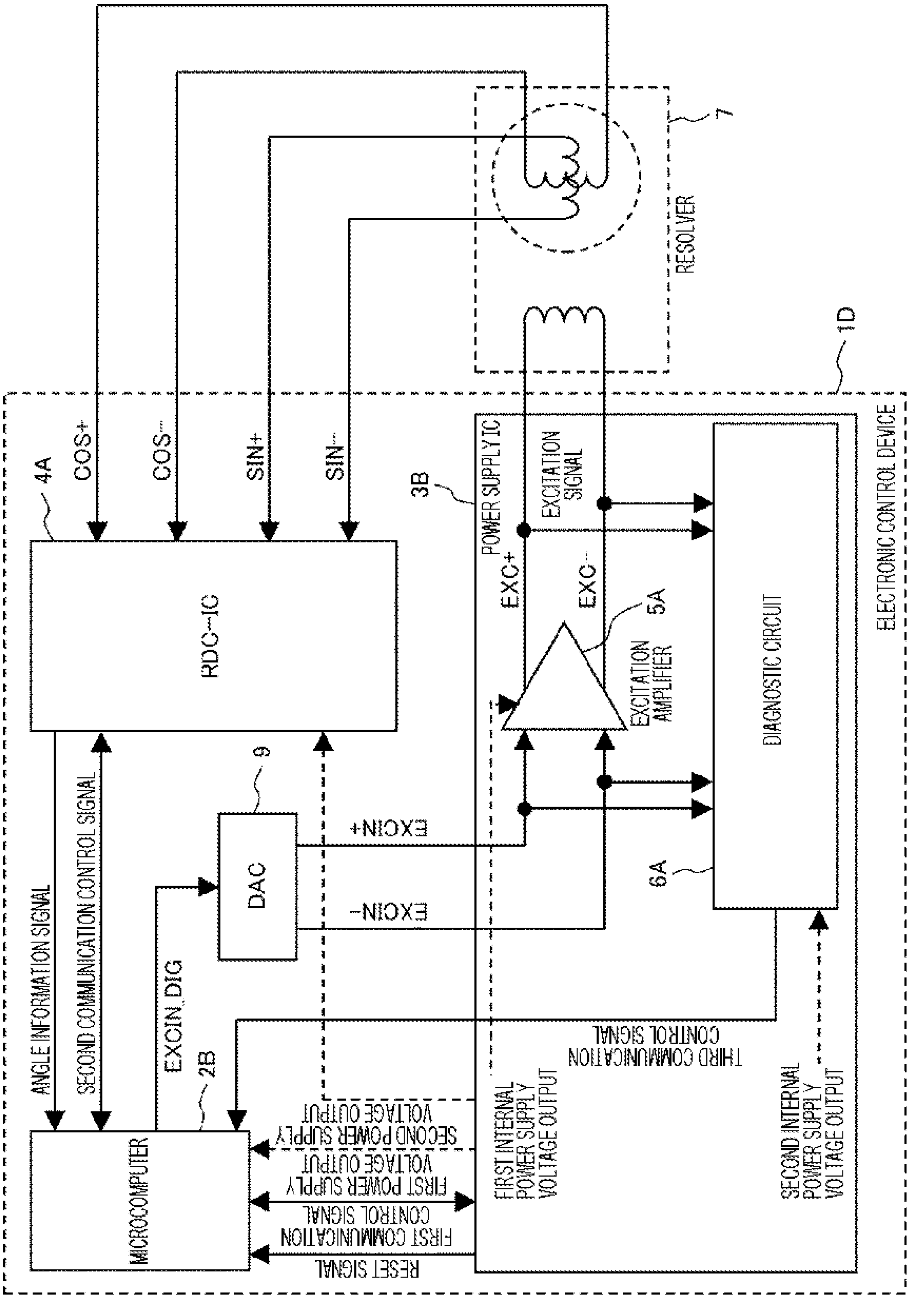
FIG. 11 is a block diagram of an electronic control device according to a fifth example of the present invention.

An electronic control device and a method for diagnosing the same according to a fifth example of the present invention will be described with reference to FIG. 11. FIG. 11 is a block diagram illustrating an internal configuration of an electronic control device of the present example.

As illustrated in FIG. 11, an electronic control device 1D of the present example includes a microcomputer 2B, an RDC-IC 4A, and a power supply IC 3B incorporating an excitation amplifier 5A and a diagnostic circuit 6A.

The present example is a modified example of the fourth example, and is different from the fourth example in that the microcomputer 2B outputs a digital signal (EXCIN_DIG), and the DAC 9 converts the digital signal (EXCIN_DIG) into an analog signal to generate and output the input signal (EXCIN+, EXCIN−) of the excitation amplifier 5A incorporated in the power supply IC 3B.

The excitation amplifier 5A outputs the excitation signal (EXC+, EXC−) to the resolver 7. The resolver 7 outputs the angle signal (COS+, COS−, SIN+, SIN−) that changes according to the rotation angle of the rotor of the motor (not illustrated), and the RDC-IC 4A performs calculation using the angle signal (COS+, COS−, SIN+, SIN−), detects the rotation angle of the motor, and transmits the information to the microcomputer 2 by the angle information signal.

The diagnostic circuit 6A incorporated in the power supply IC 3B is used to compare the input signal (EXCIN+, EXCIN−) with the excitation signal (EXC+, EXC−), which is the output signal, of the excitation amplifier 5A to diagnose the abnormality of the excitation amplifier 5A.

The abnormality diagnosis result of the excitation amplifier 5A obtained by comparing the input/output signals of the excitation amplifier 5A is transmitted to the microcomputer 2B using the third communication control signal. The microcomputer 2B performs an appropriate safety control set in advance on the electronic control device 1D according to the abnormality diagnosis result of the excitation amplifier 5A transmitted from the diagnostic circuit 6A.

Here, the microcomputer 2B outputs the digital signal (EXCIN_DIG), but if the microcomputer 2B can directly output the analog signal, the microcomputer 2B may directly output the input signal (EXCIN+, EXCIN−) of the excitation amplifier 5A to the excitation amplifier 5A without using the DAC 9. Although the DAC 9 is disposed outside the power supply IC 3B, the DAC 9 may be incorporated in the power supply IC 3B.

Note that, in each of the examples described above, control lines and information lines considered to be necessary for description are illustrated, and not all control lines and information lines are necessarily illustrated in terms of products.

Furthermore, in each of the above-described examples, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

In addition, each example described above may be combined. Although various examples have been described above, the present invention is not limited to these contents. Other modes that can be considered within the scope of the technical idea of the present invention are also encompassed within the scope of the present invention.

REFERENCE SIGNS LIST

1, 1A, 1B, 1C, 1D electronic control device
2, 2A, 2B microcomputer (microcontroller)
3, 3A, 3B power supply IC
4, 4A RDC-IC
5, 5A excitation amplifier
6, 6A diagnostic circuit
7 resolver
8 angle detection unit
9 DAC (Digital-Analog Converter)
10 frequency comparison unit
11 amplitude comparison unit
12 delay (phase) comparison unit
13 communication interface circuit
21 input frequency counter
22 output frequency counter
23 input frequency comparison unit
24 output frequency comparison unit
25 frequency set value
26 frequency diagnosis unit
31 input signal voltage detection unit
32 output signal voltage detection unit
33 gain calculation unit
34 gain comparison unit
35 gain set value
36 amplitude diagnosis unit
41 phase comparator
42 phase shift comparison unit
43 phase shift allowable value
44 delay (phase) diagnosis unit

The invention claimed is:

1. An electronic control device comprising:
a power supply IC;
a microcomputer to which a power supply voltage is supplied from the power supply IC;
an excitation amplifier that excites a resolver; and
a diagnostic circuit that monitors an input signal and an output signal of the excitation amplifier and diagnoses abnormality, wherein
the diagnostic circuit compares the input signal with the output signal to perform abnormality diagnosis of the excitation amplifier, and transmits a diagnosis result to the microcomputer, wherein
the diagnostic circuit compares at least one piece of information among frequency, amplitude, and delay information with an input signal and an output signal of the excitation amplifier to perform abnormality diagnosis of the excitation amplifier.

2. The electronic control device according to claim 1, wherein
the excitation amplifier and the diagnostic circuit are incorporated in the power supply IC.

3. The electronic control device according to claim 1, wherein
the diagnostic circuit measures at least one of frequency, amplitude, and delay information with respect to an input signal and an output signal of the excitation amplifier, and transmits a measurement value to the microcomputer.

4. The electronic control device according to claim 1, wherein
the microcomputer transmits a diagnosis input signal to the excitation amplifier after system power is turned on;
the excitation amplifier outputs a diagnosis excitation signal based on the diagnosis input signal;
the diagnostic circuit compares the diagnosis input signal and the diagnosis excitation signal to perform abnormality diagnosis of the excitation amplifier, and transmits a diagnosis result to the microcomputer; and
the microcomputer performs normal activation of the system when the diagnosis result is normal, and executes processing appropriate for an abnormal part when the diagnosis result is abnormal.

5. The electronic control device according to claim 4, wherein
the diagnostic circuit continues to operate during system operation,
when the diagnostic circuit detects an abnormality in the microcomputer, the diagnostic circuit executes processing appropriate for an abnormality content, and
when the diagnostic circuit determines that the microcomputer does not have abnormality and the diagnosis result received by the microcomputer is abnormal, the microcomputer executes processing appropriate for an abnormal part.

6. A method for diagnosing an electronic control device to which an excitation amplifier that outputs an excitation signal to a resolver, a microcomputer, and a power supply IC are mounted, the method comprising the steps of:

monitoring an input signal and an output signal of the excitation amplifier, comparing the input signal with the output signal to perform abnormality diagnosis of the excitation amplifier, and transmitting a diagnosis result to the microcomputer, wherein abnormality diagnosis of the excitation amplifier is performed by comparing at least one piece of information among frequency, amplitude, and delay information with an input signal and an output signal of the excitation amplifier.

7. The method for diagnosing an electronic control device according to claim 6, wherein the excitation amplifier and the diagnostic circuit that performs abnormality diagnosis of the excitation amplifier are incorporated in the power supply IC.

8. The method for diagnosing an electronic control device according to claim 7, wherein at least one of a frequency, an amplitude, and delay information is measured with respect to an input signal and an output signal of the excitation amplifier, and a measurement value is transmitted to the microcomputer.

9. The method for diagnosing an electronic control device according to claim 6, wherein the microcomputer transmits a diagnosis input signal to the excitation amplifier after system power is turned on;

the excitation amplifier outputs a diagnosis excitation signal based on the diagnosis input signal;

the diagnosis input signal and the diagnosis excitation signal are compared to perform abnormality diagnosis of the excitation amplifier, and a diagnosis result is transmitted to the microcomputer; and the microcomputer performs normal activation of the system when the diagnosis result is normal, and executes processing appropriate for an abnormal part when the diagnosis result is abnormal.

10. The method for diagnosing an electronic control device according to claim 9, further comprising:

executing processing appropriate for an abnormality content when an abnormality of the microcomputer is detected during a system operation; and when it is determined that the microcomputer does not have abnormality and determined that the diagnosis result received by the microcomputer is abnormal, the microcomputer executes processing appropriate for an abnormal part.

11. An electronic control device comprising:

a power supply IC;

a microcomputer to which a power supply voltage is supplied from the power supply IC;

an excitation amplifier that excites a resolver; and a diagnostic circuit that monitors an input signal and an output signal of the excitation amplifier and diagnoses abnormality, wherein the diagnostic circuit compares the input signal with the output signal to perform abnormality diagnosis of the excitation amplifier, and transmits a diagnosis result to the microcomputer, wherein the microcomputer transmits a diagnosis input signal to the excitation amplifier after system power is turned on;

the excitation amplifier outputs a diagnosis excitation signal based on the diagnosis input signal;

the diagnostic circuit compares the diagnosis input signal and the diagnosis excitation signal to perform abnormality diagnosis of the excitation amplifier, and transmits a diagnosis result to the microcomputer; and the microcomputer performs normal activation of the system when the diagnosis result is normal, and executes processing appropriate for an abnormal part when the diagnosis result is abnormal.

* * * * *